(12) United States Patent
Lee et al.

(10) Patent No.: US 6,961,739 B2
(45) Date of Patent: Nov. 1, 2005

(54) METHOD FOR MANAGING DIRECTORIES OF LARGE-SCALE FILE SYSTEM

(75) Inventors: Yong Ju Lee, Cheonlabuk-Do (KR); Gyoung Bae Kim, Taejon (KR); Bum Joo Shin, Taejon (KR)

(73) Assignee: Electronics and Telecommuncciations Research Institute, Taejon (KR)

( * ) Notice: Subject to any disclaimer, the term of this patent is extended or adjusted under 35 U.S.C. 154(b) by 435 days.

(21) Appl. No.: 10/190,588

(22) Filed: Jul. 9, 2002

(65) Prior Publication Data

US 2003/0177151 A1 Sep. 18, 2003

(30) Foreign Application Priority Data

Mar. 14, 2002 (KR) ........................................ 2002-13800

(51) Int. Cl.$^7$ ............................................. G06F 17/30
(52) U.S. Cl. ...................... 707/205; 707/202; 707/203; 707/204
(58) Field of Search .................... 707/1–10, 100–104.1, 707/200–206

(56) References Cited

U.S. PATENT DOCUMENTS 5,930,805 A * 7/1999 Marquis ....................... 707/21
6,266,705 B1 * 7/2001 Ullum et al. ............... 711/216

FOREIGN PATENT DOCUMENTS

KR        2001-47384        6/2001        ............. G06F/5/00

OTHER PUBLICATIONS

Kenneth W. Preslan, et al.; *A 64–bit Shared Disk File System for Linux*; To appear in the Sixteenth IEEE Mass Storage Systems Symposium held jointly with the Seventh NASA Goddard Conference on Mass Storage Systems & Technologies; Mar. 15–18, 1999; San Diego, CA; pp. 1–20.

Ronald Fagin and H. Raymond Strong; *Extendible Hashing–A Fast Access Method for Dynamic Files*; ACM Transactions on Database Systems, vol. 4, No. 3; Sep. 1979; pp. 315–344.

* cited by examiner

*Primary Examiner*—Jean M. Corrielus
*Assistant Examiner*—Isaac M. Woo
(74) *Attorney, Agent, or Firm*—Mayer, Brown, Rowe & Maw LLP

(57) ABSTRACT

The present invention relates to the method for managing directories of a large-scale file system. The present invention the steps of creating root blocks which have a fixed global depth, calculating an index value which shows the location information on how many bits will be referenced for root blocks from the global depth through a hash function when root blocks are completely filled with directories, calculating the block numbers of leaf blocks consisted of extent blocks based on a plurality fixed length platform which are logical and successive objects using the index value and storing the block numbers sequentially to the root blocks, and storing the directory entries of root blocks separately in leaf blocks.

As a result, the present invention can improve the search performance by minimizing the cause of frequently change of data storage structure of the file system and flexibly preventing creation of indirect blocks.

8 Claims, 5 Drawing Sheets

METHOD FOR MANAGING DIRECTORIES OF LARGE-SCALE FILE SYSTEM

BACKGROUND OF THE INVENTION

The present invention relates to file systems. More particularly, the invention relates to a method for managing directories of a large-scale file system by applying a transformed Extendible hashing technique based a fixed length Extent-based allocation on a directory which is one of the important objects.

In general, a file system is a key part of the technologies for operating systems (OS) such as Windows (Microsoft), LINUX (Open Source) and UNIX. A sub-system, which allows the user's data to be stored in an easily understandable format, includes EXT2 (Extended file system 2) and GFS (Global File System).

All objects managed by the above file systems can be expressed as inode and exist in various forms including files, directories and links in the data storage structure of a device. The data storage structure can be classified as root blocks which have a global depth and leaf blocks which have a local depth. A directory of a data storage structure is an object which allows files to be stored systematically.

Also, the file system manages a directory by allowing an insertion of a directory into a block and allowing a searching operation through an application of the Extendible Hashing technique and the block mapping method which uses a hash function.

As shown in FIG. 1, the data storage structure of EXT2 which is a standard file system in LINUX environment manages a directory in the form of unsorted linear list if one block is completely filled with directory entries.

The following shows a more detailed explanation of the management method. In the data storage structure of a file system as disclosed, the structural information for internally expressing a directory which appears in an operating system as a root block and leaf block, more specifically, a plurality of directories which possess one directory entry are stored. Likewise, pluralities of directories which possess one directory entry are also stored in one of EXT2 blocks.

As shown in FIG. 1, a directory entry 10 comprises, inode11 which shows the same unique object ID as a block number at which it can be stored, rec_len12 which shows the total length of the entry itself, name-len13 which shows the length of the name of the directory, file_type14 which shows the information pertaining to the directory type, and name15 which shows the name of the real directory. For instance, if a directory such as "C:\WINDOWS" exists, then the name of the directory becomes "WINDOWS" and the length of the directory name become "7".

The directory entry 10 is sequentially stored in one root block 20 continuously. As shown in FIG. 1, if one root block 20 is completely filled up, the information of the next block 21(i.e., block number) is stored in the header area of the previous block 20 using Linked List structure of EXT2 and the directory entries are sequentially assigned on a new block 21 continuously. As a reference, block 21 and 22 correspond to leaf blocks of root block 20, block 22 corresponds to the next block to block 21 and block 21 corresponds to the previous block to 22.

However, the sequential directory management method like EXT2 is inappropriate for a large-scale file system since the length of Linked List corresponding to a block increases with an exponential increase in the number of the directory entries. Especially, as the length of Linked List increases, the time taken to perform an insertion, search and deletion of directory entry increases accordingly.

As shown in FIG. 2, in case of Global File System (GFS) which was developed to resolve the problem associated with the sequential directory management method of EXT2, the Extendible hashing technique is used for managing the directory. The following shows a more detailed explanation of the management method based on data storage structure.

In GFS, the hash value field 16 which stores bit rows for applying the Extendible Hashing technique and extended directory entries 10a added to the conventional directory entry 10 as shown in FIG. 1, are sequentially stored in root block 30 continuously.

At this instance, a transformed value obtained by applying a certain hash function against the name of directory entries 10a is used for the hash value. If root block 30 is completely filled up by directory entries 10a, then each of directory entries 10a is separated and stored at leaf block 31 and 32.

In practice, if a global depth of root block 30 is assumed to be "1", then first of all, an index value, which represents the location information for the number of bits to be referenced from the global depth of root block 20 in terms of the hash function, is calculated, i.e., 21=2(0 or 1).

Next, if one of the bit pointers for directory entries 10a in root block 30 indicates "0", then corresponding directory entries 10a are stored in leaf block 31 on the upper part of FIG. 2. If one of the bit pointers for directory entries 10a in root block 30 indicates "1", then corresponding directory entries 10a are stored in leaf block 32 on the lower part of FIG. 2.

For instance, if 10 directories of root block 30 exist under "C:\" directory with the name such as "C:\1, 2, 3, 4, 5, 6, 7, 8, 9, 10", then using a modular calculation value such as "%2" is used in hash function the directories "2, 4, 6, 8, 10" are stored in block 31 and the directories "1, 3, 5, 7, 9" are stored in block 32. When a directory stored in this way is searched, the number of search amount is reduced to ½ in comparison to the conventional sequential directory management method.

Also, if directory entries 10a are separately stored in each of two leaf blocks 31 and 32, directory entries 10a of root block 30 are deleted and the block numbers for leaf block 31 and 32 are sequentially stored.

At this instance, if a situation, where all the block numbers are not able to be stored in block 30, occurs, indirect blocks 30a and 30b are created and the block numbers for the indirect blocks are stored in root block 30. Afterwards, the block numbers that indicate to leaf blocks 31, 32, 31a which are stored in the existing root blocks are stored in the newly assigned indirect blocks.

However, for the directory management method using the extended hashing technique of GFS, indirect blocks 30a and 30b with a full flat structure has to be created whenever a situation occurs where the block numbers for root lock 30 are unable to be stored. Also, since the block size for leaf blocks 31, 32, 31a are limited, the data storage structure consisted of the blocks on which the extended hashing technique is applied has to be frequently modified and extended.

The sequential directory management method like EXT2 or the directory management method using the Extendible hashing technique of GFS, uses a storage structure of block platform as shown in FIG. 4 that maps 1:1 for each of the area in root block 40 where only the block numbers of leaf blocks 41 and 42 can be stored.

However, when the above storage structure is implemented to a large-scale file system where insertion of directory entries are frequently occurs, the necessity of an extension of the storage structure also occurs frequently. As a result, the structure is transformed into a structure that stores the first block number of successive blocks which is sequentially assigned to store the block numbers at the storage space of the root blocks using the block assign technique of Extent-based allocation as shown in FIG. 5.

Although the block assign technique based on a standard Extent-based allocation as shown in FIG. 5, can store successive numbers of leaf blocks based on a number of variable Extent-based allocation in one address storage space of root block 40, it is inappropriate for extent assignment for an Extendible hashing, extent extension and reduction since the length has to be stored separately and the calculated result from an equation for variable extent search can not be used.

SUMMARY OF THE INVENTION

The present invention is designed to overcome the above problems of prior art. The object of the invention is to provide a method for managing directories of a large-scale file system by managing directories in terms of memorizing the next insertion location of the directories using a scan indicator that prevents sequential search within an extent block and forming indirect blocks in the form of semi-flat shape by applying the transformed Extendible hashing technique based on a fixed length extent block platform and virtual block mapping technique.

The method for managing directories of a large-scale file system according to the present invention comprises the steps of creating root blocks which have a fixed global depth, calculating an index value which shows the location information on how many bits will be referenced for root blocks from the global depth through a hash function when root blocks are completely filled with directories, calculating the block numbers of leaf blocks consisted of extent blocks based on a plurality fixed length platform which are logical and successive objects using the index value and storing the block numbers sequentially to the root blocks, and storing the directory entries of root blocks separately in leaf blocks.

<Description of the Numeric on the Main Parts of the Drawings>

10: Directory Entry 20: Root Block
21, 22: Leaf Block 30: Root Block
30, 30a: Indirect Block31, 32: Leaf Block
40, 50: Root Block 60, 70, 80, 90: Leaf Block
61–64, 71–74, 81–84, 91–94: Extent Block
100: Indirect Block 110: Leaf Block
120: Root Block 130, 131, 132: Leaf Block
140, 140a: Indirect Block

DETAILED DESCRIPTION OF THE EMBODIMENTS

Hereinafter, the method for managing directories of a large-scale file system according to the present invention will be described in detail with reference to the accompanying drawings.

Figure 1:
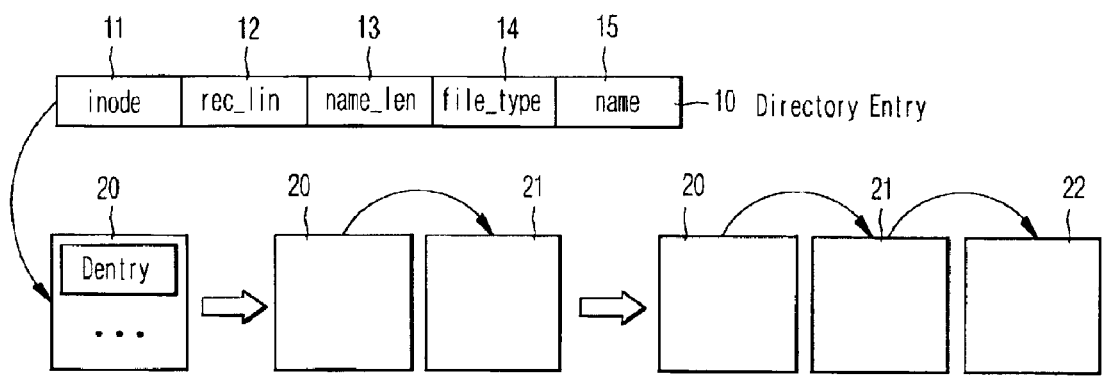
FIG. 1 shows the data storage structure of the conventional EXT2 which manages directories.
Figure 2:
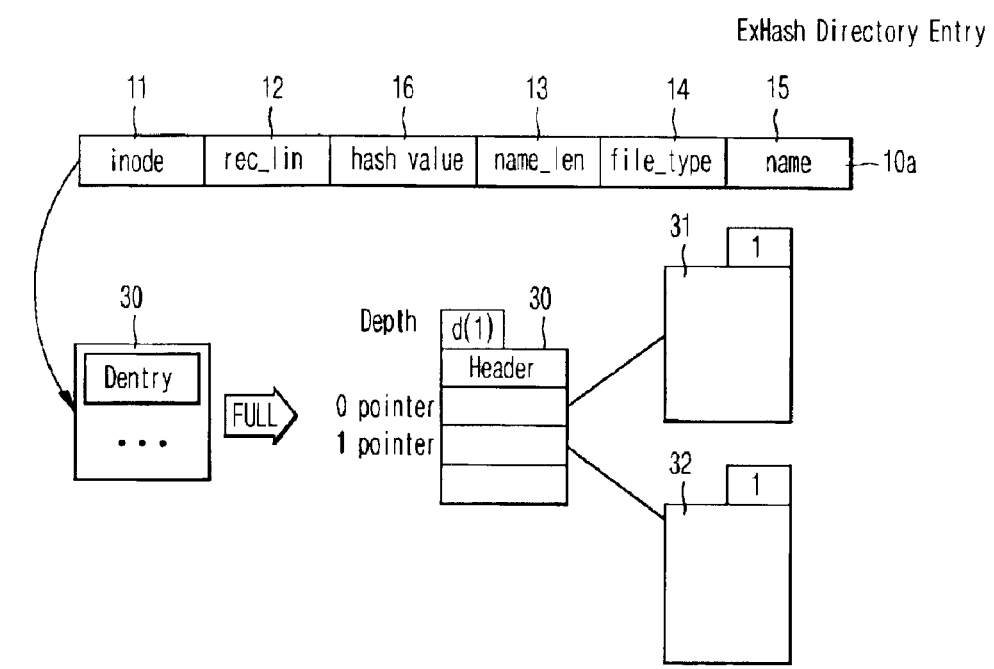
FIG. 2 shows the data storage structure of the conventional GFS which manages directories.
Figure 3:
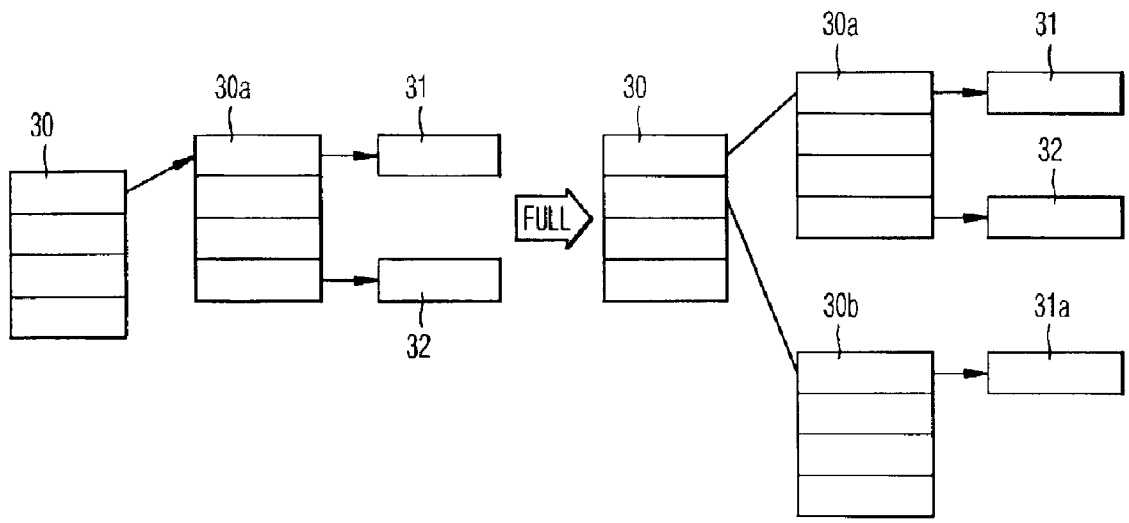
FIG. 3 shows the data storage structure of the conventional EXT2 which manages directories by forming indirect blocks of full flat structure.
Figure 4:
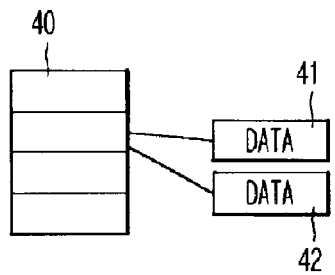
FIG. 4 shows a block platform data structure of the conventional EXT2 or GFS that is implemented by block mapping technique in order to secure a block storage space.
Figure 5:
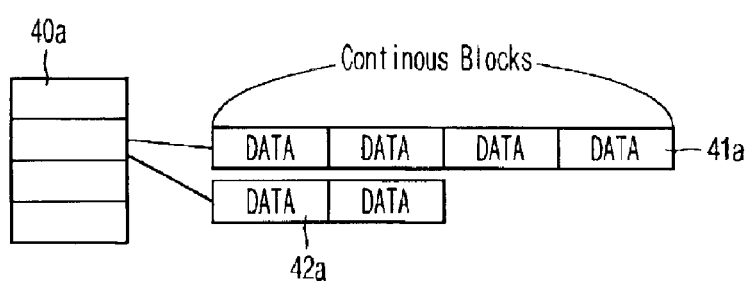
FIG. 5 shows a standard variable length block platform data structure that is implemented by block mapping technique in order to secure a block storage space.
Figure 6:
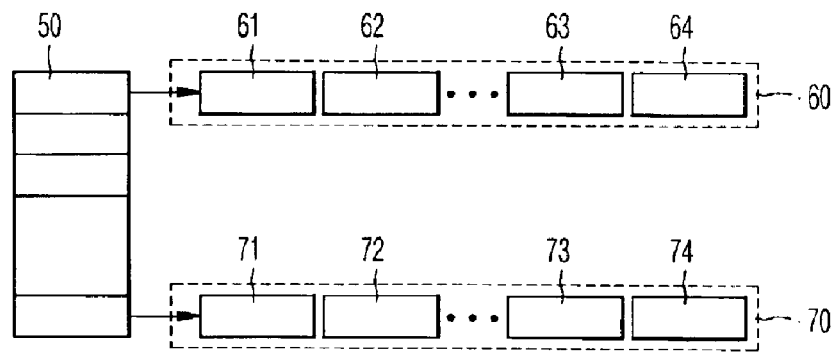
FIG. 6 shows the data storage structure of a large-scale file system according to the present invention which manages directories in order to secure a block storage space.
Figure 7:
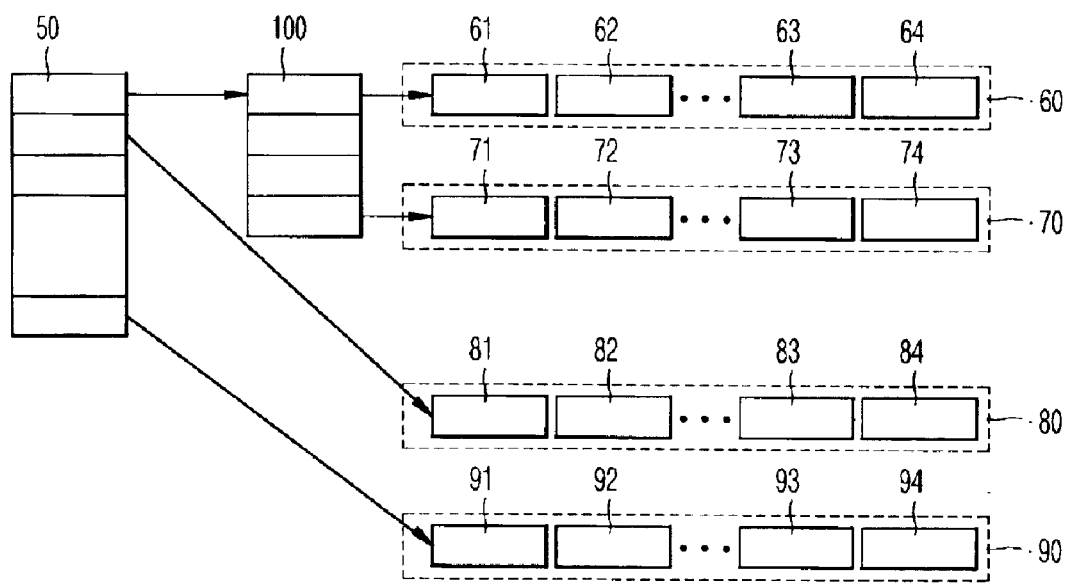
FIG. 7 shows the data storage structure of a large-scale file system according to the present invention which manages directories by forming indirect blocks of semi-flat structure.

As shown in FIG. 6 to FIG. 9, a root block 50 is created in order to store directory entries like the extended directory entries 10a that contains a hash value field 16 which stores bit rows for applying an Extendible hashing technique as shown in FIG. 2 and these directory entries are sequentially stored continuously. At this instance, root block 50 dose not have a fixed length global depth.

When root blocks 50 are completely filled with directories, an index value, which shows the location information on how many bits will be referenced for root blocks 50 from the global depth through a hash function, is calculated, and using the index value the block numbers of leaf blocks 60, 70 consisted of four extent blocks 61–64, 71–74 based on a plurality of object fixed length platform which are logical and successive objects are calculated. Afterwards, the directory entries of root blocks 50 are separately stored in leaf blocks 60, 70.

Here, the number of fixed length platform extent blocks of which each block forms leaf block 60, 70 can be added so as to make the number equal to each other according to the necessary storage space.

As the directory entries of root block 50 are separately stored in leaf blocks 60, 70 which are consisted of four extent blocks 61–64, 71–74 based on a plurality of object fixed length platform, if a situation occurs where the block numbers of leaf blocks 60, 70 are no longer able to be stored in root block 50, then the large-scale file system according to the present invention creates indirect blocks 100 in order to store the block numbers of the leaf blocks 60, 70 sequentially and afterwards the directory entries of root block 50 are separately stored in leaf blocks 60, 70.

Also, the block numbers of leaf blocks 80, 90, which are remained after storing to indirect blocks 100, are sequentially stored to root block 50. The directory entries of root block 50 are stored in the remaining leaf blocks 80, 90. The remaining leaf blocks 80, 90 are consisted of four extent blocks 81–84, 91–94 based on a plurality of object fixed length platform which are also logical and successive objects.

Figure 8:
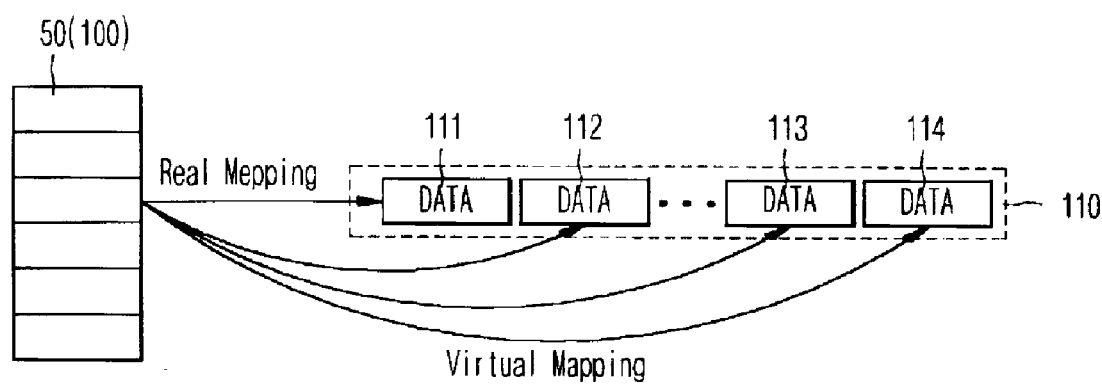
FIG. 8 shows the data storage structure of a large-scale file system according to the present invention based on a fixed length extent block platform that implements a virtual mapping technique.

The method for managing directories of a large-scale file system according to the present invention, when calculating the block numbers of leaf blocks 60, 70, 80, 90 consisted of extent blocks 61–64, 71–74, 81–84, 91–94 based on a plurality of object fixed length platform which are logical and successive objects and storing sequentially in root blocks 50 and indirect blocks 100, firstly, the block number of the first extent block 111, among a plurality of successive extent blocks 111–114 that form one leaf block 110, is calculated using virtual block mapping technique and store it in root blocks 50 or indirect blocks 100 as shown in FIG. 8, secondly, the block numbers for the remaining other extent blocks 112–114 can be virtually calculated through a scan indicator which implements an offset concept which is used for finding the location within one block that is a unit for generating I/O in a standard file system.

If the block numbers for successive extent blocks 111–114 that form one leaf block 110 are sequentially progress like "111, 112, 113, 114", then the block number "111" of the first extent block 111 is stored in root block 50. If a certain number of successive extent blocks are assume to be one extent block, then the remaining other block numbers can be located using the scan indicator.

At this instance, the range of the scan indicator can virtually be taken between 0 to a corresponding value. For instance, if there are four successive blocks and one block corresponds to 4K, then the range of the scan indicator is between 0 to (4X4096).

Figure 9:
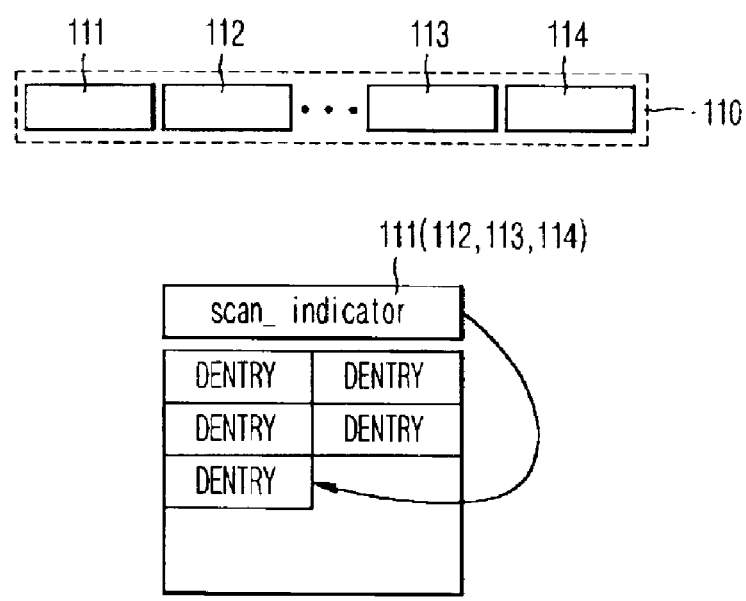
FIG. 9 shows fixed length extent blocks that form leaf blocks.

Also, the method for managing directories of a large-scale file system according to the present invention, when the directory entries are to be stored separately among leaf blocks 60, 70, 80, 90, 100, the insertion location of each entry is determined by a certain offset within the corresponding extent block, more specifically, through a scan indicator. Hence, the directory entries are stored by a scan indicator which shows the next location of the previously inserted directory entry for the plurality successive extent blocks 111–114 that form one leaf block 110 as shown in FIG. 9.

For instance, if one leaf block comprises four one extent blocks that has a storage space of "1024bit" and the block number for the first extent block of the leaf block that is stored in a root block or indirect block is assumed to be "100", and the scan indicator for the extent block is assumed to be "1030", then the block numbers for other remaining extent blocks that form the leaf block can be obtained through a division operation.

Since the storage space for one extent block is "1024bit", the storage space for a leaf block that comprises four successive extent block numbers is "4096bit". If the value of scan indicator "1030" is dividing by the storage space "1024" then 1030/1024 gives a value "1". Hence the block with a scan indicator value "1030" has a block number which has "1" added to the value of the first block number, more specifically, it is a "100+1=101th" block.

Also, if Modular calculation of hash function is applied to the scan indicator "1030", then "1030%1024=6". As a result, if a scan indicator with a value "1030" is assigned, then it can be calculated that a 6th space area of 101th extent block is the next position of the previously inserted directory entry and the corresponding directory entry can be stored in this particular storage space.

Figure 10:
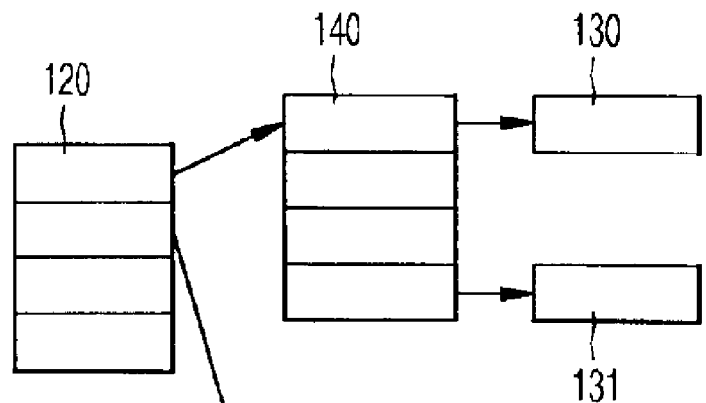
FIG. 10 shows the data storage structure which manages directories by forming indirect blocks of conventional full flat structure and the data storage structure according to the present invention which manages directories by forming indirect blocks of semi-flat structure.
Figure 10:
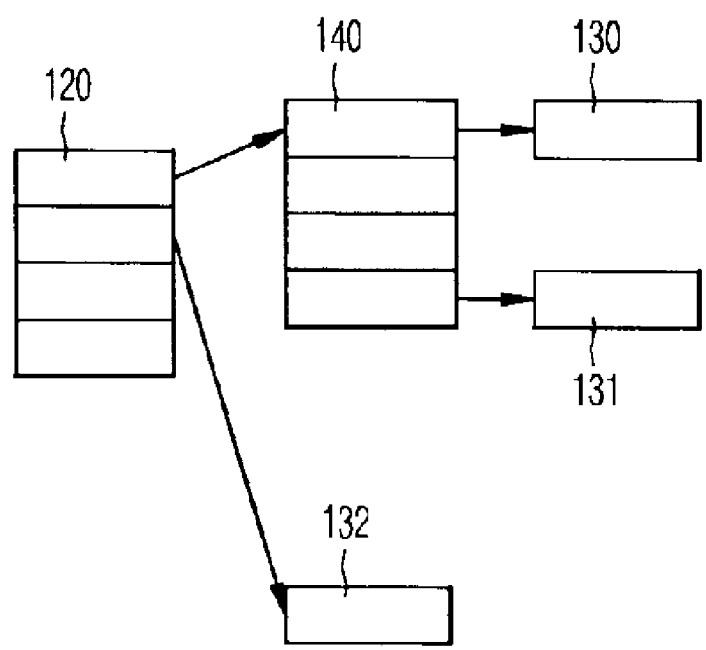

Finally, with reference to FIG. 10, the following shows the difference between the data storage structure that manages directories by forming indirect blocks of the conventional full flat structure and the data storage structure that manages directories by forming indirect blocks of the semi-flat structure according to the present invention.

According to the conventional file system, when all the block numbers for leaf block 130, 131 can not be stored in root block 120, indirect blocks 140, 140a which can replace the role of storing block numbers in leaf block 120 are created whenever leaf block 132 is required.

Especially, according to the conventional file system, when a situation where all the block numbers for leaf block 130, 131 can not be stored in root block 120 due to an increase of a single directory entry occurs, new indirect block 140a has to be created additionally and hence the data storage structure has to be extended or improved frequently.

However, according to the present invention, even if directory entries increase beyond the storage capacity of root block 120, the data storage structure does not have to be extended or improved frequently. This is achieved by storing the directory entries of root block 120 in leaf blocks 130, 131 separately in terms of forming one indirect block 140 in order to sequentially store the block numbers of leaf blocks 130, 131 and also storing the block numbers of leaf block 132 that stores newly increased directory entries if the number of increased directory entries are not enough to fill the newly added indirect blocks 140a completely.

As explain so far, the method for managing directories of a large-scale file system according to the present invention can improve the search performance by minimizing the cause of frequently change of data storage structure of the file system and flexibly preventing creation of indirect blocks in terms of managing directories through memorizing the next insertion location of the directories using a scan indicator that prevents a sequential search within an extent block and forming indirect blocks in the form of semi-flat shape by applying the transformed Extendible hashing technique based on a fixed length extent block platform and virtual block mapping technique.

Especially, the method for managing directories of a large-scale file system according to the present invention can minimize the I/O processing overhead for indirect blocks within the file system by forming the indirect blocks in semi-flat structure that is easily extended and contracted while storing the block numbers of leaf blocks.

Also, since leaf blocks are extended to extent blocks based on a fixed length platform which is logical and successive objects rather physical blocks, consequently, the depth of the total data storage structure implemented by Extendible hashing technique can be increased by increasing the number of directory entries that can be stored in one extent. Moreover, the easiness for re-insertion for directory entries can be improved by using a scan indicator which memorizes the next position of the previously inserted directory entry.

The method for managing directories of a large-scale file system according to the present invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method for managing directories of a large-scale file system, said method comprising:
creating root blocks which have a fixed global depth;
finding an index value, when said root block are completely filled with directory entries, said index value showing the location information on how many bits will be referenced for root blocks from said global depth through a hash function;

finding block numbers of leaf blocks using said index values, said leaf blocks being comprised of extent blocks based on a plurality of fixed length platform which are logical and successive objects;

storing the block numbers sequentially to said root blocks, and storing the directory entries of said root blocks separately in said leaf blocks, wherein said storing the block numbers of leaf blocks in root blocks, comprises:

creating indirect blocks so as to store the block numbers of the leaf blocks sequentially if a situation occurs where the block numbers of leaf blocks are no longer able to be stored in said root blocks;

storing the directory entries of root blocks separately in leaf blocks;

storing the block numbers of the remaining leaf blocks sequentially in root block; and storing the directory entries of root blocks in the remaining leaf blocks.

2. The method as claimed in claim 1, wherein said step of finding the block numbers of leaf blocks which are consisted of extent blocks based on a plurality of fixed length platform which are logical and successive objects so as to store them in the root blocks comprises finding the block number of the first extent block among a plurality of successive extent blocks that form one leaf block and storing it in the root blocks.

3. The method as claimed in claim 1, wherein said step of finding the block numbers of leaf blocks which are consisted of extent blocks based on a plurality of fixed length platform which are logical and successive objects so as to store them in the indirect locks comprises finding the block number of the first extent block among a plurality of successive extent blocks that form one leaf block and storing it in the indirect blocks.

4. The method as claimed in claim 1, wherein said step of storing the directory entries of the root blocks separately in leaf blocks comprises:

scanning a storage area by an indicator which shows the next location of the previously inserted directory entry for a plurality of the successive extent blocks that form one leaf block; and storing directory entries.

5. A method for managing directories within a file system, said method comprising:

creating root blocks which have a fixed global depth;

finding an index value when said root block are completely filled with directory entries, said index value being related to the location information and how many bits will be referenced for root blocks from said global depth through a hash function;

finding block numbers of leaf blocks using said index values, said leaf blocks being comprised of extent blocks based on a platform with a plurality of fixed length, logical and successive objects;

storing the block numbers sequentially to said root blocks;

storing the directory entries of said root blocks separately in said leaf blocks, and creating indirect blocks to sequentially store at least a portion of said block numbers of said leaf block and storing a remaining portion of said block numbers of the leaf blocks sequentially in said root blocks when a situation occurs where the block numbers of leaf blocks are too numerous to be stored in said root blocks.

6. The method of claim 5, wherein said finding of said block numbers of said leaf blocks further comprises finding said block number of said first extent block among a plurality of successive extent blocks that form one leaf block and storing it in the root blocks.

7. The method as claimed in claim 5, wherein said finding of said block numbers of said leaf blocks further comprises finding the block numbers of the first extent block among a plurality of successive extent blocks that form one leaf block and storing it in said indirect blocks.

8. The method as claimed in claim 5, wherein said storing of the directory entries of the root blocks separately in leaf blocks further comprises:

scanning a storage area by an indicator which shows a next location of the previously inserted directory entry for a plurality of the successive extent blocks that form one leaf block; and storing directory entries.

* * * * *